United States Patent
Qiu (10) Patent No.: US 10,105,010 B2
(45) Date of Patent: Oct. 23, 2018

(54) BLENDER AND EGGBEATER

(71) Applicant: NINGBO PRESSED INDUSTY CO., LTD, Ningbo (CN)

(72) Inventor: Jiaxing Qiu, Ningbo (CN)

(73) Assignee: NINGBO PRESSED INDUSTY CO., LTD, Ningbo (CN)

( * ) Notice: Subject to any disclaimer, the term of this patent is extended or adjusted under 35 U.S.C. 154(b) by 0 days.

(21) Appl. No.: 15/448,532

(22) Filed: Mar. 2, 2017

(65) Prior Publication Data

US 2018/0055290 A1 Mar. 1, 2018

(30) Foreign Application Priority Data

Aug. 23, 2016 (CN) .......................... 2016 1 0713071

(51) Int. Cl.
*A47J 43/044* (2006.01)
*A47J 43/10* (2006.01)
*B01F 7/00* (2006.01)

(52) U.S. Cl.
CPC ............. *A47J 43/044* (2013.01); *A47J 43/10* (2013.01); *B01F 7/00583* (2013.01); *A47J 2043/04409* (2013.01); *B01F 2215/0026* (2013.01)

(58) Field of Classification Search
CPC ....................... A47J 43/044; A47J 43/10; A47J 2043/04409; B01F 2215/0026; B01F 7/00583
USPC ................................................ 366/129, 343
See application file for complete search history.

(56) References Cited

U.S. PATENT DOCUMENTS

| 401,058 | A | * | 4/1889 | Pfau | A47J 43/1093 366/129 |
| 434,635 | A | * | 8/1890 | Gregg | A47L 13/36 15/141.1 |
| 837,750 | A | * | 12/1906 | Sturma | A47J 43/1093 366/342 |
| 843,461 | A | * | 2/1907 | Husser | B63H 16/04 366/129 |
| 846,661 | A | * | 3/1907 | Godward | A47J 43/1043 248/362 |
| 866,909 | A | * | 9/1907 | Brenner | A47J 43/1093 366/343 |

(Continued)

FOREIGN PATENT DOCUMENTS

CN 202287932 U 7/2012
DE 102009003576 A1 9/2010

Primary Examiner — Tony G Soohoo
(74) Attorney, Agent, or Firm — Symbus Law Group, LLC; Clifford D. Hyra (57) ABSTRACT

A blender comprises a base, a blending mechanism and a fixing mechanism. The blending mechanism is formed by the encirclement of a plurality of thin and long curved blending units. The end portions of the two ends of each of the blending units are respectively inserted into the base. Parts of the end portions of all blending units in connection with the base are positioned on the same circumference. The clearances between two adjacent blending units are equal or similar. The fixing mechanism comprises a plurality of fixing units corresponding to the blending units one-to-one, and the fixing units are inserted into the base and fix the end portions of the corresponding blending unit that extend into the base in the base. The blender has the advantages of stable operation and uniform blending of the pulp and mediums after blending and beating.

15 Claims, 4 Drawing Sheets

(56) References Cited

U.S. PATENT DOCUMENTS

| | | | | |
|---|---|---|---|---|
| 871,247 A * | 11/1907 | Tomlinson | A47J 43/1093 | 366/343 |
| 931,100 A * | 8/1909 | Valy | A47J 43/1093 | 416/70 R |
| 944,781 A * | 12/1909 | Gienandt | A47J 43/1093 | 366/130 |
| 1,171,054 A * | 2/1916 | Keppeler | B01F 13/002 | 366/248 |
| 1,195,839 A * | 8/1916 | Moses | A47J 43/1093 | 366/129 |
| 1,210,192 A * | 12/1916 | Moses | A47J 43/1093 | 366/129 |
| 1,287,741 A * | 12/1918 | Pinkney | A47J 43/1093 | 366/343 |
| 1,463,736 A * | 7/1923 | Ward | A47J 43/0705 | 366/197 |
| 1,468,560 A * | 9/1923 | Diehl | A47J 43/0711 | 366/343 |
| 1,722,187 A * | 7/1929 | Wetzel | A47J 43/0711 | 416/214 R |
| 1,783,437 A * | 12/1930 | Laib | A47J 43/0705 | 366/288 |
| 1,786,603 A * | 12/1930 | Dawson | A47J 43/0711 | 366/343 |
| 2,277,986 A * | 3/1942 | Karp | A47J 43/0711 | 366/343 |
| 2,397,011 A * | 3/1946 | Jensen | A47J 43/0711 | 366/343 |
| 2,949,284 A * | 8/1960 | Egedal | A47J 43/1093 | 24/115 R |
| 3,412,983 A * | 11/1968 | Kesilman | A47J 43/0711 | 140/71 R |
| 5,354,129 A * | 10/1994 | Yowell | B01F 7/00008 | 241/282.1 |
| 2005/0207276 A1* | 9/2005 | Xu | A47J 43/1093 | 366/343 |
| 2007/0014187 A1* | 1/2007 | Kaas | A21C 1/02 | 366/325.6 |
| 2015/0150416 A1* | 6/2015 | Hoare | A47J 43/0711 | 366/344 |
| 2015/0223640 A1* | 8/2015 | Choy | A47J 43/044 | 366/286 |

* cited by examiner

BLENDER AND EGGBEATER

CROSS-REFERENCE TO RELATED APPLICATIONS

This non-provisional application claims priority to Chinese Patent Application No. CN201610713071.5, filed Aug. 23, 2016, which is incorporated herein by reference in its entirety.

BACKGROUND OF THE INVENTION

1. Technical Field

The present invention belongs to the technical field of food processing equipment, and relates to a blender and an eggbeater, in particular to a blender and an eggbeater which apply to the food industry, restaurant kitchens and large-sized central kitchens.

2. Description of Related Art

The eggbeater, as a common blending and mixing device for food processing, is used for blending and beating pulp such as sugar pulp, batter and cheese, with high practicability. An eggbeater usually consists of a container and a blender. The blender is a component which enforces convection between the pulp and mediums (for example, water and air) needed to be added and blends the materials uniformly.

In prior art, the blender and the eggbeater are mainly for household use, and rarely seen in industrial fields and central kitchens of restaurants. Further, blending components of the currently used blenders are usually thin and long structures. The thin and long blending components directly penetrate a base and then are directly fastened on the base by bending the ends thereof, thus causing shaking, displacement, looseness and other side effects during blending and beating. The stability is poor and the blended pulp is not uniform. In conclusion, a blender which works stably and ensures that the pulp is uniformly mixed with the medium after blending and beating is needed.

BRIEF SUMMARY OF THE INVENTION

The objective of the present invention is to provide a blender which works stably and ensures uniform blending of the blended and beaten pulp and a medium, and an eggbeater.

The objective of the present invention can be achieved by the following technical solution: A blender includes:
 a base;
 a blending mechanism, formed by the encirclement of a plurality of thin and long curved blending units, wherein the end portions of the two ends of each of the blending units are respectively inserted into the base; parts of the end portions of all blending units in connection with the base are positioned on the same circumference; the clearances between two adjacent blending units are equal or similar; and a fixing mechanism, including a plurality of fixing units corresponding to the blending units one to one, wherein the fixing units are inserted in the base and fix the ends of the corresponding blending units that extend into the base in the base.

As a further improvement of the present invention, the base is configured as a round disc structure, and the ends of the blending units are inserted into the base in an inclined way at positions close to the edge of the base.

As a further improvement of the present invention, the end portions of the blending units are inserted into the base and then placed in the base.

As a further improvement of the present invention, the fixing units are inserted into the base in an inclined way and are crossed with the end portions of the corresponding blending units. In such circumstances, the crossing is vertical or approximately vertical. The end portions of the blending units are inserted into the base from the top down in an inclined way, and then the corresponding fixing units are inserted into the base from the bottom up in an inclined way.

As a still further improvement of the present invention, the fixing units are pressed against the middle or positions close to the middle of the corresponding bending units after being inserted into the base.

As a still further improvement of the present invention, the base is provided with an outward and upward first annular inclined surface at an edge on a side close to the blending mechanism, and the end portions of the blending units are inserted into the base in an inclined way along the first inclined annular inclined surface.

As a still further improvement of the present invention, the end portions of the blending units are inserted into the base along the middle position of the first annular inclined surface along the direction vertical to or approximately vertical to the first annular inclined surface.

As a still further improvement of the present invention, the base is provided with an outward and downward second annular inclined surface at an edge on a side away from the blending mechanism, and the fixing units are inserted into the base in an inclined way along the second inclined annular inclined surface.

As a further improvement of the present invention, the fixing units are inserted into the base along the middle position of the second annular inclined surface in the direction vertical to or approximately vertical to the second annular inclined surface.

As a further improvement of the present invention, the blending units are thin and long curved bent steel wires.

As a further improvement of the present invention, the fixing units are branched screws matched with the bent steel wires.

As another improvement of the present invention, the middle part of the base is axially formed with a mounting through-hole, and the mounting through-hole is detachably equipped with a fixing head.

As a further improvement of the present invention, the fixing head is provided with a boss, and the mounting through-hole is provided with a clamping groove matched with the boss.

As another improvement of the present invention, the blender also includes a cover and the cover consists of a horizontal segment and a bent segment; the bent segment is tightly covered on the second annular inclined surface; the fixing units are disposed on the inner side of the bent segment, and the horizontal segment is tightly covered on the end face of the base away from the blending mechanism.

As a further improvement of the present invention, the cover is detachably attached at the base through a plurality of hexagon socket head cap screws, and the hexagon socket head cap screws are disposed on the horizontal segment.

As another improvement of the present invention, the blending units encircle and form a spherical or ellipsoid-shaped structure, and the blending units are configured as a curved structure which is higher in the middle and lower on two sides and has two symmetric sides.

As another improvement of the present invention, the blending units are configured from the top down in turn by several groups; viewed from the top down, each group includes two blending units which are distributed up and down in a crossed way; the group of blending units positioned on the top uniformly divides the area encircled by the blending mechanism into four parts, and the second group of blending units directly below the top group further equally divides the encircled area into eight parts; and the remaining groups of blending units are arranged in a similar way below.

As a further improvement of the present invention, the middle protruding portions of two adjacent blending units are in a clearance fit.

As a still further improvement of the present invention, six groups of blending units are disposed from the top down.

An eggbeater includes the blender, a driving unit and a container which has an opening and is used for accommodating pulp; the driving unit is connected with the base; the blending mechanism of the blender is capable of extending into the container and is driven by the driving unit to blend and beat the pulp in the container.

Based on the above technical solution, the embodiments of the present invention can generate at least the following technical effects: In the initial state, the pulp and necessary mediums are placed in the outer container, the base of the blender is on the top, and the blending mechanism is on the lower side and extends downward into the container; during working, the base together with the blending mechanism is driven to rotate, blend and beat the pulp, the pulp and the mediums are continuously mixed during the blending and beating process, the blending mechanism in the blender is formed by the encirclement of a plurality of thin and long curved blending units, and the parts of the end portions of all blending units in connection with the base are positioned at the same circumference, which means that the standing points of the end portions of the blending units encircle and form a circumferential face, clearances between two adjacent blending units are equal or similar, so the blending units encircle and form a compact blending structure with uniformly distributed clearances, the pulp and the medium are uniformly stressed during beating, the pulp and the medium are uniformly blended after beating; besides, the end portions of the two ends of the blending units are respectively inserted into the base, and the end portions extended in the base are limited by the corresponding fixing units and fixed in the base, ensuring the reliability of the fixing, the whole blender works stably, and does not tend to shake, even if a single thin and long blending unit shakes, it returns quickly by the limiting effect of the fixing units on the corresponding two sides, ensuring the working stability of the whole structure and avoiding shaking, displacement, looseness, and other phenomena during blending when the thin and long blending structure directly passes and is fastened on the base.

BRIEF DESCRIPTION OF THE SEVERAL VIEWS OF THE DRAWINGS

The present invention is described in further detail with reference to the attached drawings and embodiment.

As shown in the figures, 10—base; 11—first annular inclined surface; 12—second annular inclined surface; 13—mounting through-hole; 14—clamping groove; 20—blending mechanism; 21—blending unit; 30—fixing mechanism; 31—fixing unit; 40—fixing head; 41—boss; 50—cover; 51—horizontal segment; 52—bent segment; 60—hexagon socket head cap screw.

DETAILED DESCRIPTION OF THE INVENTION

To make the technical means, characteristics of creation, purpose and effectiveness of attainment of realizing the present utility model easy to understand, the present utility model is further clarified in combination with the embodiments.

The technical solution of the present invention is described in further detail in conjunction with the specific embodiments and the attached drawings of the present invention.

The present invention claims protection for a blender and an eggbeater, bigger than household eggbeaters in size, preferably applicable to food processing sites such as food industry, restaurant kitchens and large-sized central kitchens. The size ratios and/or driving components of the blender and the eggbeater can also be changed such that the blender and the eggbeater can be applied to common household kitchens. In the present solution, the blender and the eggbeater using the blender are preferably power-driven hardware tools to ensure efficient working efficiency and high degree of automation and to meet the industrial demands on high capacity and high quality.

Figure 1:
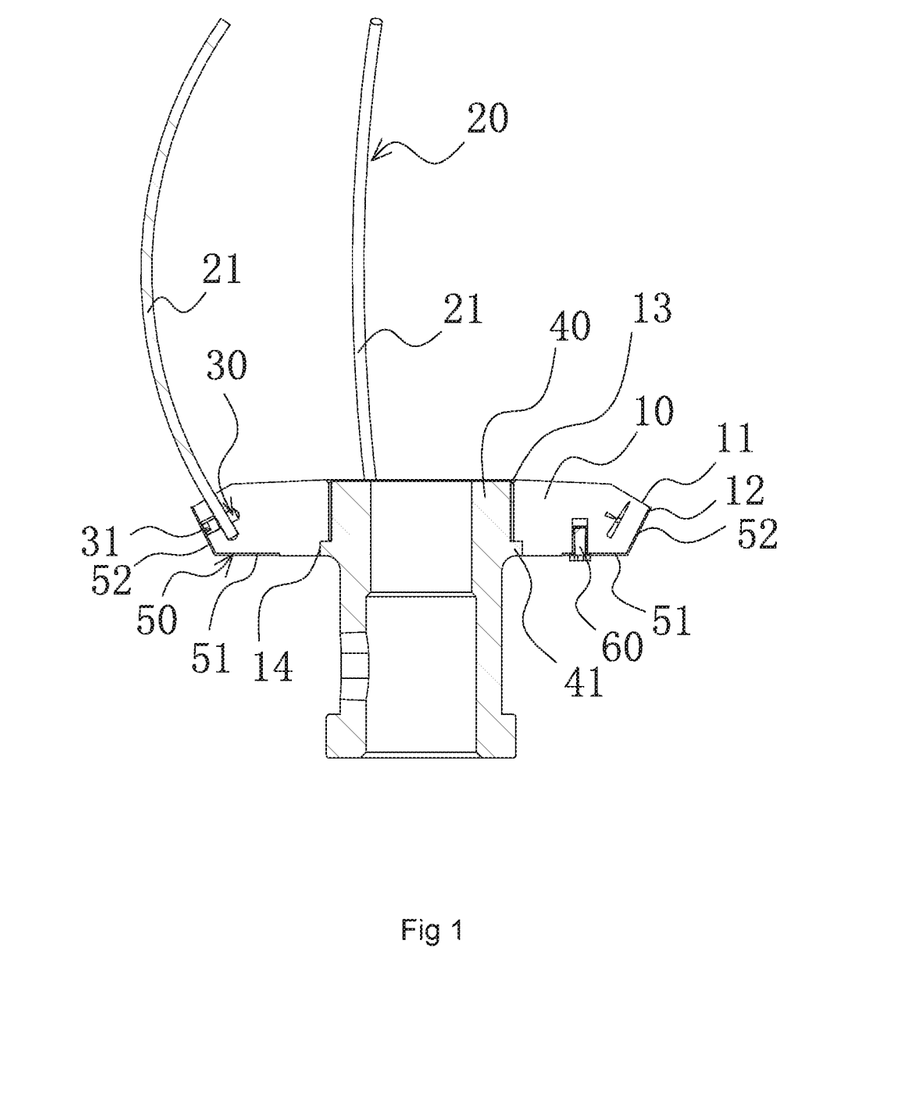
FIG. 1 is a partial structural view of a preferable embodiment of the present invention.
Figure 4:
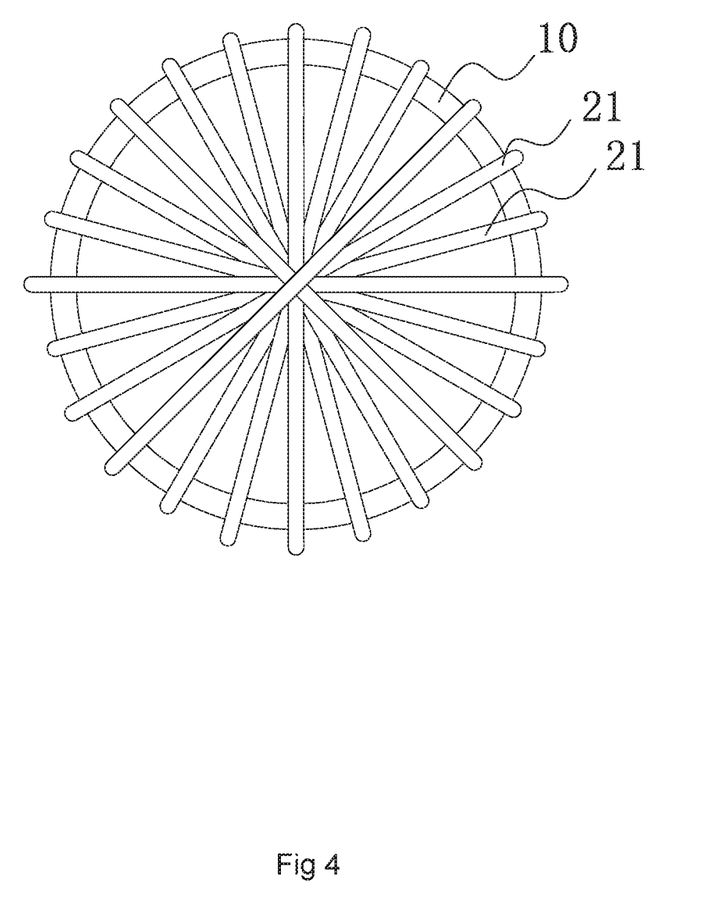
FIG. 4 is a structural view of FIG. 3 viewed at another angle.

The technical solution provided by the present invention is described in further detail in conjunction with FIG. 1 and FIG. 4.

As shown in FIGS. 1-4, a blender includes:

a base 10;

a blending mechanism 20, formed by the encirclement of a plurality of thin and long curved blending units 21, wherein the end portions of the two ends of each of the blending units 21 are respectively inserted into the base 10; parts of the end portions of all blending units 21 in connection with the base 10 are positioned on the same circumference; the clearances between two adjacent blending units 21 are equal or similar; and, a fixing mechanism 30, including a plurality of fixing units 31 corresponding to the blending units 21 one by one, wherein the fixing units 31 are inserted into the base 10 and fix the end portions of the corresponding blending units 21 which extend in the base 10 in the base 10.

In the present invention, the base serves as the mounting base body of the whole blender and the connecting base body for driving the blending mechanism 20 to rotate; the blending mechanism 20 is used for blending pulp, and in the present solution, the pulp can be fluidized or viscous. The pulp can be any pulp capable of being blended, for example egg liquid, sugar pulp and noodle pulp. During the blending process, the pulp is mixed with an added medium. The medium can be added water, or originally existing air, etc. Preferably, the blender is applied to the beating of egg liquid.

The fixing mechanism 30 is used for fixing the blending mechanism 20 on the base 10 such that the base 10 is more stable and works reliably when driving the blending mechanism 20 to run.

Further preferably, the fixing units 31 are used for limiting and compressing the end portions of the corresponding blending units 21. In order to enhance the blending and mixing effect and reduce pulp adhesion, the blending units 21 are preferably curved structures which have middles higher than two sides and have two symmetric sides, wherein the sides are arc-shaped or approximately arc-shaped.

In the initial state, the pulp and necessary medium are placed in a container; the base 10 of the blender is on the upper side, while the blending mechanism 20 is on the lower side and extends into the container. During operation, the base 10 is driven to rotate the blending mechanism 20 and beat the pulp. During pulp beating, the pulp and the medium are continuously mixed. The blending mechanism 20 in the present solution is the enclosure of a plurality of thin and long curved blending units 21, the parts of the end portions of all blending units 21 in connection with the base 10 being positioned at the same circumference, which means that the standing points of the end portions of the blending units 21 encircle and form a circumferential face, clearances between two adjacent blending units are equal or similar, so the blending units encircle and form a compact blending structure with uniformly distributed clearances, the pulp and the medium are uniformly stressed during beating, and the pulp and the medium are uniformly blended after beating. Besides, the end portions of the two ends of the blending units 21 are respectively inserted into the base 10, and the end portions extended in the base 10 are limited by the corresponding fixing units 31 and fixed in the base 10, ensuring the reliability of the fixing, the whole blender works stably, and does not tend to shake. Even if a single thin and long blending unit 21 shakes, it returns quickly by the limiting effect of the fixing units 31 on the corresponding two sides, ensuring the working stability of the whole structure and avoiding shaking, displacement, looseness, and other phenomena during blending when the thin and long blending structure directly passes and is fastened on the base 10.

Figure 2:
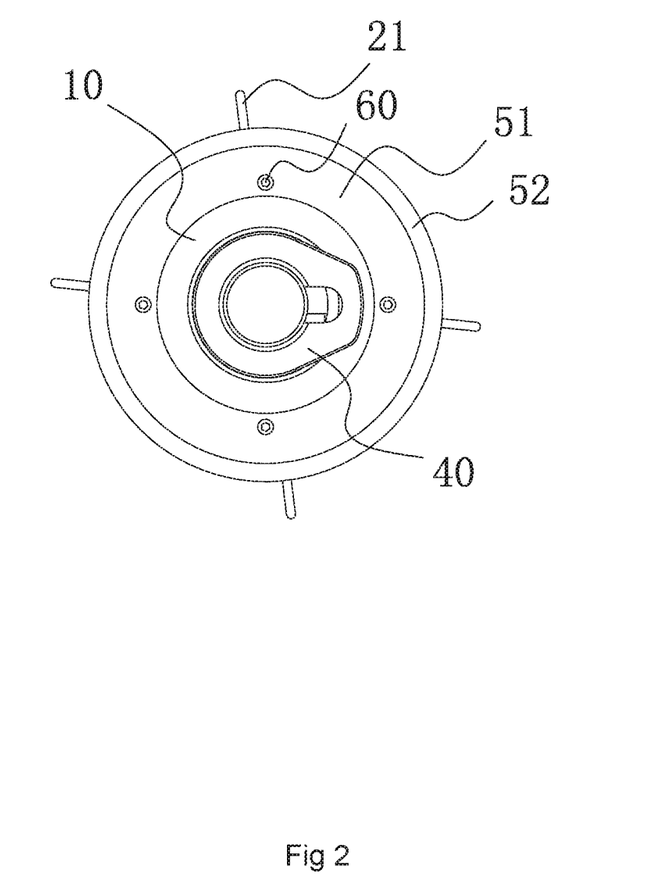
FIG. 2 is a structural view of FIG. 1 viewed at another angle.

In order to maintain the structural layout of the circumferentially distributed blending structure 20 and ensure blending stability and the uniformity of pulp mixing, the base 10 in the present invention is preferably set as a round disc-shaped structure. In order to ensure that the fixing is firmer and also to facilitate dismantling, the end portions of the blending units 21 are not directly vertically inserted, but the end portions of the blending units 21 are preferably inserted into the base 10 in an inclined way and the inserted positions are close to the edge of the base 10, so the base 10 can circumferentially limit the blending units 21, and the fixing units 31 further clamp the end portions of the blending units 21.

It is worth mentioning that: the end portions of the blending units 21 in the present solution are inserted into the base 10 but do not penetrate out of the base 10, which means that the end portions of the blending units 21 are kept in the base 10 after being inserted into the base 10 and that the end portions of the blending units 21 are not exposed out of the base 10. The end portions are fixed and limited by the corresponding fixing units 31 in the fixing mechanism 30, ensuring the reliability of the connection, avoiding shaking and looseness of the blending units 21, and other phenomena.

Further, in order to ensure that the fixing units 31 are tightly matched with the blending units 21, the blending units 21 are more firmly fixed when the base 10 drives the blending mechanism 20 to rotate circumferentially.

The fixing units 31 are preferably inserted into the base 10 in an inclined way and are crossed with the end portions of the corresponding blending units 21. In such circumstances, the crossing is vertical or approximately vertical. The end portions of the blending units 21 are inserted into the base 10 from the top down in an inclined way, and then the corresponding fixing units 31 are inserted into the base 10 from the bottom up in an inclined way. Here, the fixing units 31 apply forces which are vertical to the ends of the blending units 21 and the blending units 21 are firmly fixed on the base 10 to prevent the blending units 21 from being loosened and thrown off by the effect of the centrifugal force during operation.

In order to ensure that the end portions of the blending units 21 can be reliably fixed in the base 10 and to ensure that the circumferential locking forces of the end portions of the blending units 21 are big enough to overcome external dragging forces for axially extracting the blending units 21 out of the base 10, preferably, the fixing units 31 are pressed against the middle or at positions close to the middle of the corresponding blending units 21 after being inserted into the base 10.

Further, in order to more closely maintain the structural layout where the standing points of the blending units 21 are positioned at a circumference and also to maintain the bent shapes of the end portions of the blending units 21 such that the base 10 continuously applies wrapping and gripping forces to the blending units 21 to prevent the blending units 21 from loosening, preferably, the base 10 is provided with an outward and upward first annular inclined surface 11 at an edge close to one side of the blending mechanism, and the base 10 is provided with an outward and downward second annular inclined surface 12 at an edge away from the blending mechanism 12; the end portions of the blending units 21 are inserted into the base 10 along the first annular inclined surface 11, and the fixing units 31 are inserted into the base 10 along the second annular inclined surface 12. In the present solution, the inclined surfaces are opposite planes or are inclined relative to the flat upper end face of the base 10.

Further, in order to ensure convenience of installation and dismantling and firmness after installation, and to maintain the structure of the thin and long blending units 21, the end portions of the blending units 21 are preferably inserted into the base 10 from the middle position of the first annular inclined surface 11 along the direction vertical to or approximately vertical to the first annular inclined surface 11, and the fixing units 31 are inserted into the base 10 from the middle position of the second annular inclined surface 12 along the direction vertical to or approximately vertical to the first annular inclined surface 12; and the inclined angle between the first annular inclined surface 11 and the second annular inclined surface 12 is a right angle or the inclined angle is close to 90°.

As a preferable or optimal implementation mode, the blending units 21 are thin and long curved bent steel wires. The bent steel wires are used as the blending units 21, so the processing is convenient, the cost is low, and the blender is easily cleaned and does not tend to adhere after blending.

Further, in order to ensure the limiting and pressing effects and the convenience of installation and dismantling, the fixing units 31 are preferably set as branched screws matched with the bent steel wires.

In the present invention, the middle part of the base 10 is axially formed with a mounting through-hole 13. The mounting through-hole 13 is detachably equipped with a fixing head 40. During operation, the fixing head 40 can be directly connected with the driving parts, driving the fixing head 40 together with the base 10 and the blending mechanism 20 to rotate and work reliably. Moreover, the detachable mounting mode facilitates replacement, maintenance and cleaning. The blender is of high practicability and high universality.

In order to ensure the limiting of the fixtures and to ensure the reliability of connection during operation, further preferably, the fixing head 40 is provided with a boss 41, and the mounting through-hole 13 is provided with a clamping groove 14 matched with the boss 41. In the present solution, the clamping groove 14 is preferably disposed on one side of the base 10 away from the blending mechanism 20, and the further preferably the fixing head 40 is hollow.

In order to ensure fixing firmness, to prevent the fixing units 31 from loosening and to ensure the flatness of the overall structural layout and the smoothness of the outer surface, the blender also includes a cover 50 and the cover 50 consists of a horizontal segment 51 and the blending segment 52; the blending segment 52 is closely covered on the second annular inclined surface 12; the fixing units 31 are placed on the inner side of the blending segment 52; and the horizontal segment 51 is closely covered on the end face of the base 10 away from the blending mechanism 20.

Further, the cover 50 is preferably detachably installed on the base 10 through a plurality of hexagon socket head cap screws 60, and the hexagon socket head cap screws 60 are placed on the horizontal segment 51. Preferably, four hexagon socket head cap screws 60 are uniformly provided in the present solution.

Further, in order to ensure the smooth and beautiful appearance of the whole blender and reduce the viscosity of pulp, the outer end face of the horizontal segment 51, the outer end face of the boss 41 and the end face of the base 10 away from the blending mechanism 20 are leveled, and the heads of the hexagon socket head cap screws are exposed out of the end faces; preferably, the end face of the base 10 close to the blending mechanism 20 is leveled with the corresponding outer end face of the fixing head 40.

Figure 3:
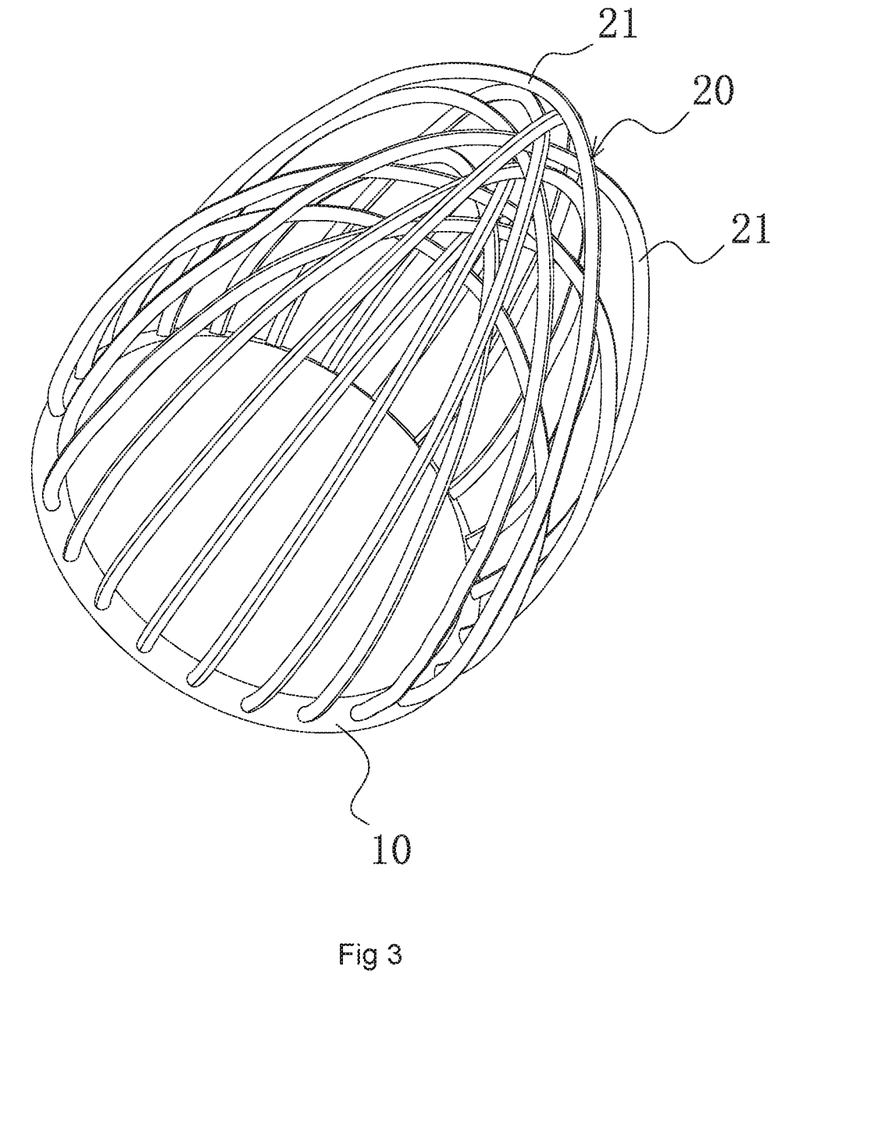
FIG. 3 is a structural view of a blending mechanism in a preferable embodiment of the present invention.

In the present invention, as shown in FIG. 3 and FIG. 4, in order to ensure uniform blending and mixing and to ensure that the pulp is uniformly stressed and that the pulp is fully mixed with the medium, the blending units 21 are preferably encircling and form a spherical or ellipsoid-shaped structure, and the blending units 21 are configured as a curved structure which is higher in the middle and lower on two sides and has two symmetric sides.

Specifically, the blending units 21 are preferably configured from the top down in turn by several groups. Viewed from the top down, each group includes two blending units 21 which are distributed up and down in a crossed way; the group of blending units 21 positioned on the top uniformly divides the area encircled by the blending mechanism 20 into four parts, and the second group of blending units 21 directly below the top group further equally divides the four equally divided encircled area into eight parts; and the remaining groups of blending units 21 are arranged in a similar way.

Each group of the blending units 21 is configured in a top-down crossed way, and the blending mechanism 20 encircled and formed by a plurality of groups of the blending units 21 is compactly arranged, capable of conducting finer and more uniform blending and beating work.

Further, the middle protruding portions of two adjacent blending units 21 are in clearance fit, which means that the tops of the two adjacent blending units 21 are spaced and that the space is relatively small, avoiding collision and ensuring the blending effect.

Preferably, in order to ensure uniform blending and mixing effects, six groups, a total of 12 blending units 21, are arranged from the top down, which equally divide the area encircled by the blending mechanism 20 into 24 blocks.

The present invention also provides for an eggbeater. The eggbeater consists of the blender, a driving unit and a container which has an opening and a container for accommodating pulp; the driving unit is connected with the base 10; the blending mechanism 20 of the blender is capable of extending into the container and is driven by the driving unit to blend and beat the pulp in the container.

Preferably, the eggbeater is an industrial stand-type eggbeater, mainly comprised of the blender, the driving unit and the container, and preferably applied to industrial operations or large-sized F&B kitchens. During the operation, the driving unit drives the blender to rotate at a high speed, forcefully blending and beating the pulp and medium in the container, so materials are fully mixed and the effects of mixing, bubbling, inflation, emulsification and removal of some part are achieved.

The specific embodiments described in the text are used for illustrating the principle of the present invention only. Those skilled in the field can make various amendments or supplementations or take similar substitutions on the basis of the described specific embodiments. The amendments, supplementations and substitutions shall fall within the principle or the protective scope claimed by the Claims of the present invention.

What is claimed is:

1. A blender, characterized by comprising:
   a base;
   a blending mechanism, comprising an encirclement of a plurality of thin and long curved blending units, wherein end portions of two ends of each of the blending units are respectively inserted in the base, and parts of the end portions of all the blending units in connection with the base are positioned on a same circumference, wherein clearances between each two adjacent blending units are equal; and,
   a fixing mechanism, comprising a plurality of fixing units corresponding to the blending units one-to-one, wherein the fixing units are inserted in the base and fix the end portions of the corresponding blending units, which extend into the base, in the base;
   wherein the base is configured as a round disc structure, and the ends of the blending units are inserted in the base in an inclined way at positions close to an edge of the base;
   wherein the fixing units are inserted in the base in an inclined way and are crossed with the end portions of the corresponding blending units, wherein the crossing is vertical or approximately vertical, wherein the end portions of the blending units are inserted in the base from the top down in an inclined way, and the corresponding fixing units are inserted in the base from the bottom up in an inclined way;
   wherein the base is provided with outward and downward second annular inclined surface at an edge on a side away from the blending mechanism, and the fixing units are inserted in the base in an inclined way along the second annular inclined surface;
   wherein the blender also includes a cover and the cover consists of a horizontal segment and a bent segment, wherein the bent segment is tightly covered on the second annular inclined surface, wherein the fixing units are disposed on an inner side of the bent segment, and wherein the horizontal segment is tightly covered on the end face of the base away from the blending mechanism.

2. The blender according to claim 1, wherein the fixing units are pressed against a middle or positions close to the middle of the corresponding bending units.

3. The blender according to claim 1, wherein the base is provided with an outward and upward first annular inclined surface at an edge on a side close to the blending mechanism, and the end portions of the blending units are inserted into the base in an inclined way along the first annular inclined surface.

4. The blender according to claim 3, wherein the end portions of the blending units are inserted in the base along the middle position of the first annular inclined surface in a direction vertical to or approximately vertical to the first annular inclined surface.

5. The blender according to claim 1, wherein the fixing units are inserted into the base along the middle position of the second annular inclined surface in a direction vertical to or approximately vertical to the second annular inclined surface.

6. The blender according to claim 1, wherein the blending units are curved bent steel wires.

7. The blender according to claim 6, wherein the fixing units are branched screws matched with the bent steel wires.

8. The blender according to claim 1, wherein a middle part of the base is axially formed with a mounting through-hole, and the mounting through-hole is detachably equipped with a fixing head.

9. The blender according to claim 8, wherein the fixing head is provided with a boss, and the mounting through-hole is provided with a clamping groove matched with the boss.

10. The blender according to claim 1, wherein the cover is detachably attached at the base through a plurality of hexagon socket head cap screws, and the hexagon socket head cap screws are disposed on the horizontal segment.

11. The blender according to claim 1, wherein the blending units encircle and form a spherical or ellipsoid-shaped structure, and the blending units are configured as a curved structure which is higher in the middle and lower on two sides and which has two symmetric sides.

12. The blender according to claim 11, wherein the blending units are configured from the top down in turn as several groups, wherein viewed from top down, each group includes two blending units which are distributed up and down in a crossed way, wherein a group of blending units positioned on the top uniformly divides the area encircled by the blending mechanism into four parts, and a second group of blending units directly below the top group further equally divides the four equally divided encircled area into eight parts, and the remaining groups of blending units are arranged in a similar way.

13. The blender according to claim 12, wherein middle protruding portions of two adjacent blending units are in a clearance fit.

14. The blender according to claim 12, wherein six groups of blending units are disposed from the top down.

15. An eggbeater, comprising the blender according to claim 1, a driving unit and a container which has an opening and is used for accommodating pulp, wherein the driving unit is connected with the base, the blending mechanism of the blender is capable of extending into the container and is driven by the driving unit to blend and beat pulp in the container.

* * * * *